United States Patent
Nakamoto et al.

(10) Patent No.: US 10,457,490 B2
(45) Date of Patent: Oct. 29, 2019

(54) TRANSFER APPARATUS AND HOLDING APPARATUS

(71) Applicant: KABUSHIKI KAISHA TOSHIBA, Tokyo (JP)

(72) Inventors: Hideichi Nakamoto, Tokyo (JP); Haruna Eto, Tokyo (JP); Akihito Ogawa, Tokyo (JP); Junya Tanaka, Tokyo (JP); Takafumi Sonoura, Kanagawa (JP); Toshikatsu Akiba, Chiba (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 211 days.

(21) Appl. No.: 15/392,786

(22) Filed: Dec. 28, 2016

(65) Prior Publication Data
US 2017/0107058 A1    Apr. 20, 2017

Related U.S. Application Data

(63) Continuation of application No. PCT/JP2015/063448, filed on May 11, 2015.

(30) Foreign Application Priority Data

Sep. 10, 2014  (JP) .................. 2014-183998

(51) Int. Cl.
*B65G 65/02*  (2006.01)
*B65G 37/00*  (2006.01)
(Continued)

(52) U.S. Cl.
CPC .............. *B65G 37/00* (2013.01); *B25J 9/042* (2013.01); *B25J 13/00* (2013.01); *B25J 15/0061* (2013.01);
(Continued)

(58) Field of Classification Search
CPC ..................................................... B65G 65/02
See application file for complete search history.

(56) References Cited

U.S. PATENT DOCUMENTS

| 5,015,145 A * | 5/1991 | Angell ................... B65G 61/00 |
|---|---|---|
| | | 414/391 |
| 5,524,747 A * | 6/1996 | Wohlfahrt ............ B65G 59/023 |
| | | 198/512 |

(Continued)

FOREIGN PATENT DOCUMENTS

| JP | 61-134883 | 8/1986 |
|---|---|---|
| JP | 6-144575 | 5/1994 |

(Continued)

OTHER PUBLICATIONS

International Preliminary Report on Patentability and Written Opinion issued by The International Bureau of WIPO dated Mar. 23, 2017, for International Application No. PCT/JP2015/063448.

(Continued)

*Primary Examiner* — Mark C Hageman
(74) *Attorney, Agent, or Firm* — Finnegan, Henderson, Farabow, Garrett & Dunner, L.L.P.

(57) ABSTRACT

According to one embodiment, a transfer apparatus includes a base, a first linear motion member, a second linear motion member, a moving conveyor, an extraction arm, and a holding part. The first linear motion member is supported by the base and is movable in a first direction. The second linear motion member is supported by the first liner motion member and is movable in a second direction crossing the first direction. The moving conveyor is supported by the second linear motion member and includes a belt for conveying an article. The extraction arm is provided on a side of the moving conveyor, extracts the article and places the article (Continued)

on the belt. The holding part is provided at an end of the extraction arm and holds the article.

14 Claims, 15 Drawing Sheets

(51) Int. Cl.
| | |
|---|---|
| *B25J 13/00* | (2006.01) |
| *B65G 47/91* | (2006.01) |
| *B66F 7/28* | (2006.01) |
| *B25J 15/06* | (2006.01) |
| *B25J 17/02* | (2006.01) |
| *B65G 15/00* | (2006.01) |
| *B65G 41/00* | (2006.01) |
| *B25J 9/04* | (2006.01) |
| *B25J 15/00* | (2006.01) |
| *B25J 19/02* | (2006.01) |
| *B65G 59/04* | (2006.01) |
| *B65G 65/00* | (2006.01) |

(52) U.S. Cl.
CPC ....... *B25J 15/0616* (2013.01); *B25J 17/0208* (2013.01); *B25J 19/023* (2013.01); *B65G 15/00* (2013.01); *B65G 41/003* (2013.01); *B65G 47/91* (2013.01); *B65G 59/04* (2013.01); *B65G 65/00* (2013.01); *B66F 7/28* (2013.01); *Y10S 901/40* (2013.01)

(56) References Cited

U.S. PATENT DOCUMENTS

| | | | |
|---|---|---|---|
| 6,923,612 B2 | 8/2005 | Hansl | |
| 8,365,898 B2* | 2/2013 | Horst | A01D 87/122 198/512 |
| 9,238,304 B1* | 1/2016 | Bradski | B25J 9/163 |
| 9,296,569 B2* | 3/2016 | Hellenbrand | B65G 1/0421 |
| 9,498,887 B1* | 11/2016 | Zevenbergen | B25J 15/0616 |
| 9,555,982 B2* | 1/2017 | Girtman | B25J 9/0093 |
| 9,969,573 B2* | 5/2018 | Girtman | B65G 67/24 |
| 2015/0344225 A1 | 12/2015 | Nakamura et al. | |

FOREIGN PATENT DOCUMENTS

| | | |
|---|---|---|
| JP | 6-171761 | 6/1994 |
| JP | 7-133006 | 5/1995 |
| JP | 7-251937 | 10/1995 |
| JP | 2001-225952 | 8/2001 |
| JP | 2007-314260 | 12/2007 |
| JP | 2009-102124 | 5/2009 |
| JP | 2015-224125 | 12/2015 |

OTHER PUBLICATIONS

International Search Report issued by the Japanese Patent Office in International Application No. PCT/JP2015/063448, dated Jul. 28, 2015 (2 pages).

* cited by examiner

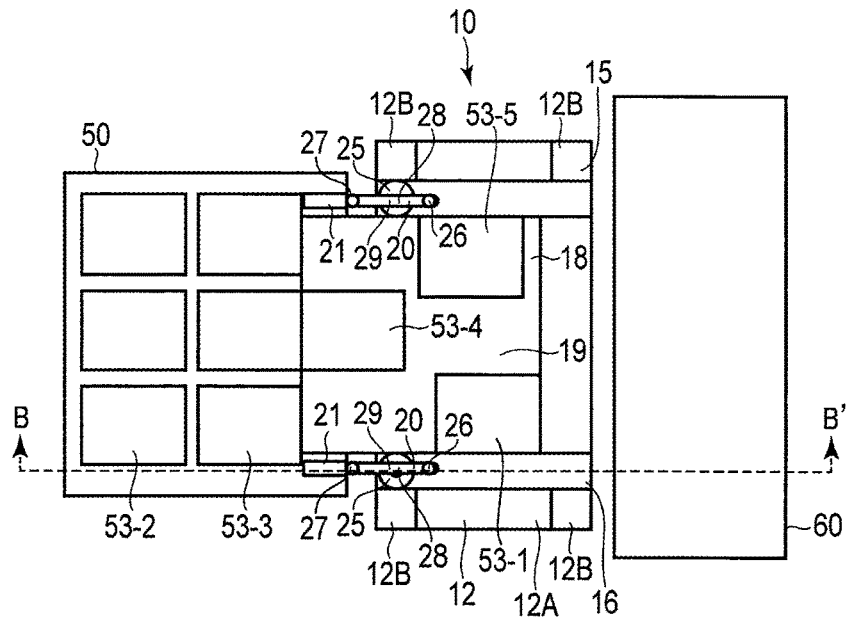
F I G. 7A
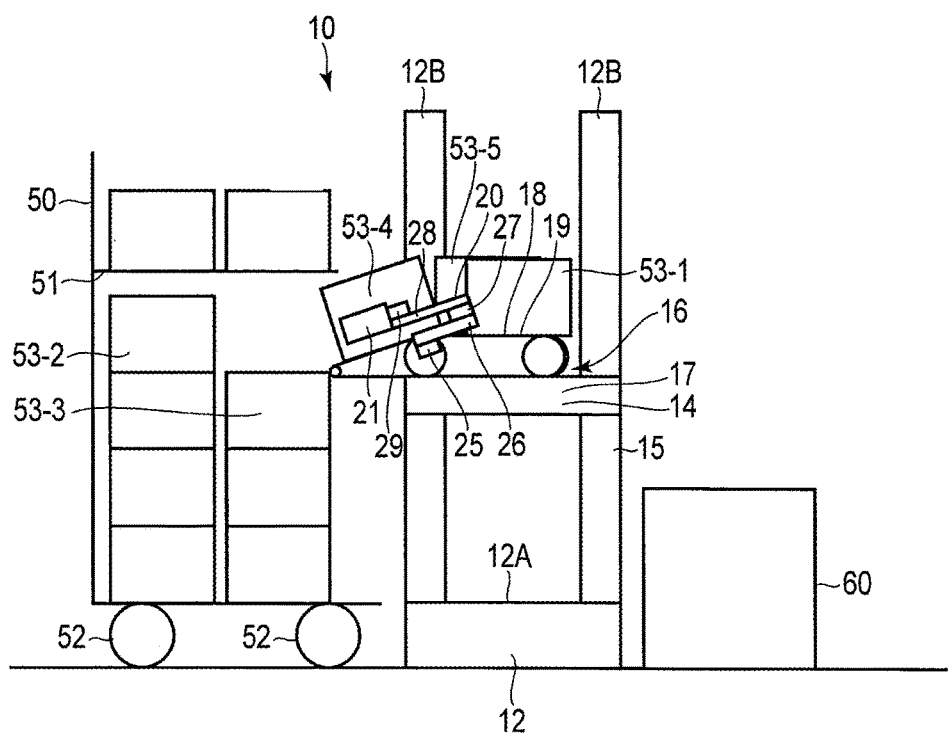
F I G. 7B

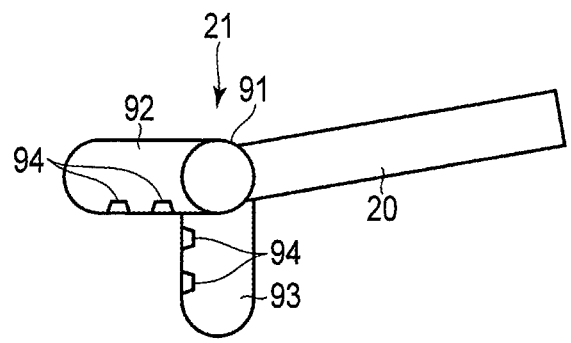
F I G. 10A
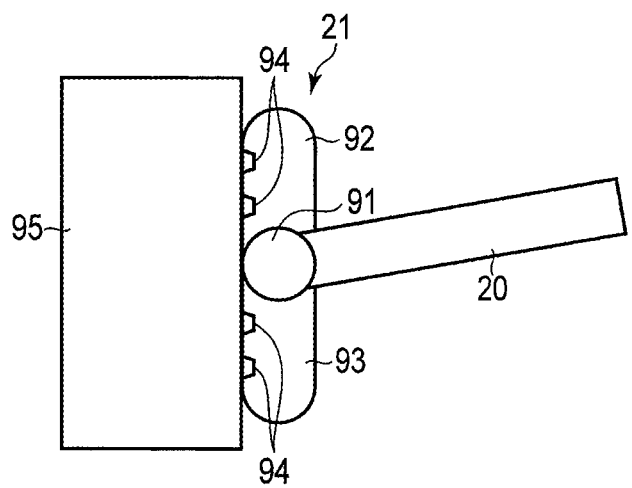
F I G. 10B

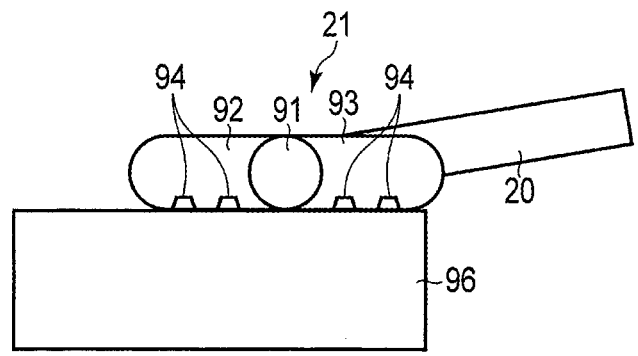
F I G. 10C
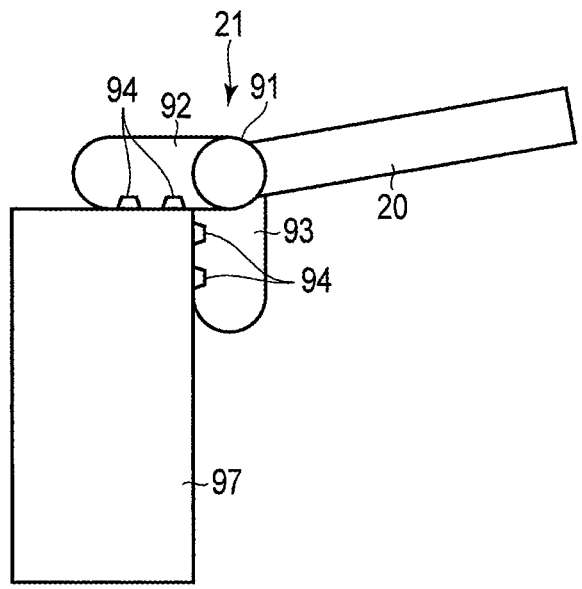
F I G. 10D

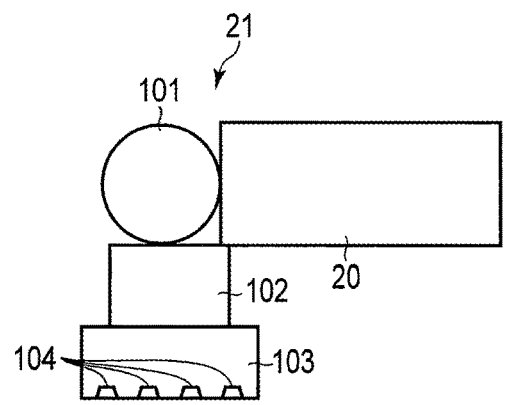
F I G. 11D
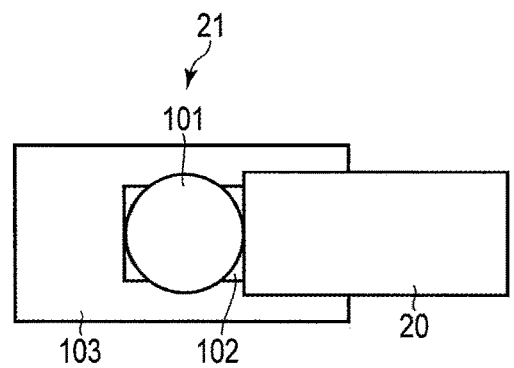
F I G. 11E
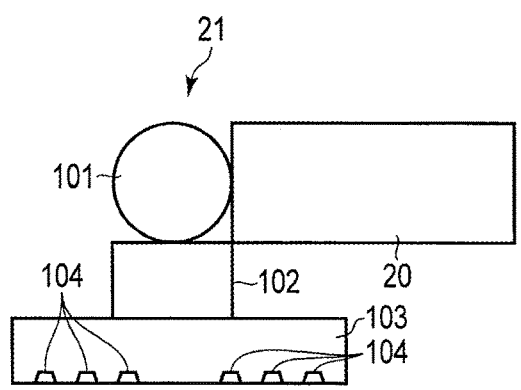
F I G. 11F

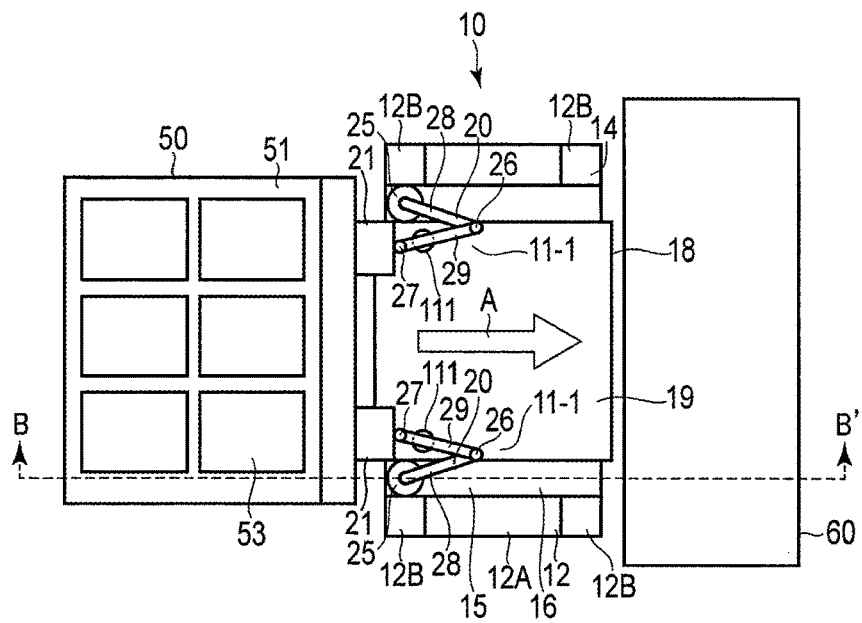
F I G. 12A
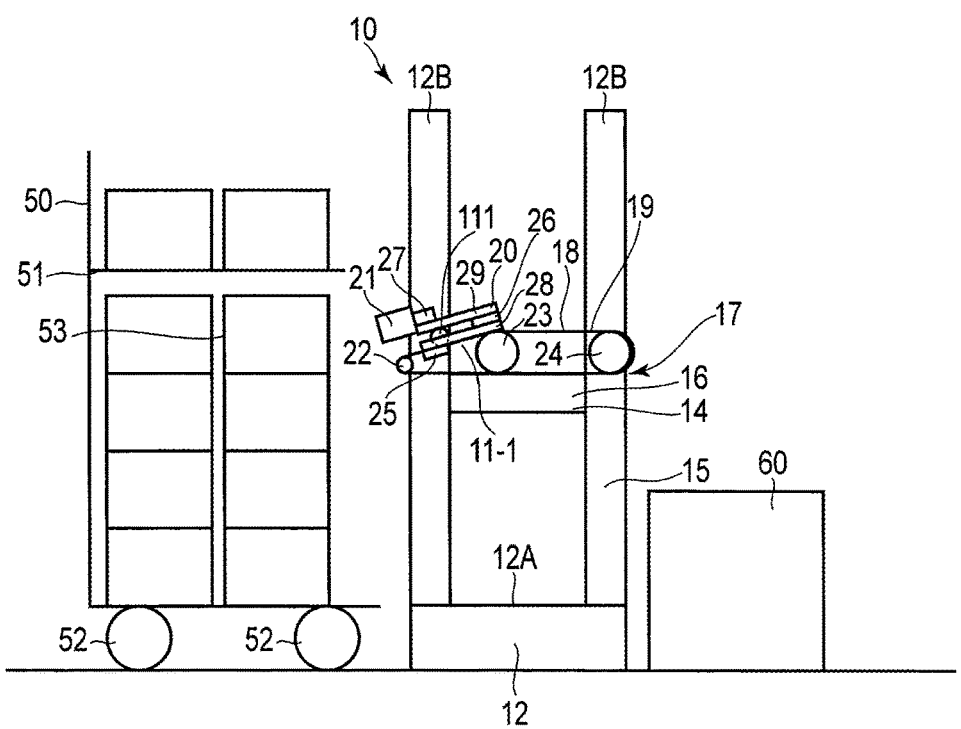
F I G. 12B

TRANSFER APPARATUS AND HOLDING APPARATUS

CROSS-REFERENCE TO RELATED APPLICATIONS

This application is a Continuation Application of PCT Application No. PCT/JP2015/063448, filed May 11, 2015 and based upon and claiming the benefit of priority from Japanese Patent Application No. 2014-183998, filed Sep. 10, 2014, the entire contents of all of which are incorporated herein by reference.

FIELD

Embodiments described herein relate generally to a transfer apparatus and a holding apparatus.

BACKGROUND

Transfer apparatuses that perform article transfer operations are required to be able to handle an article (also referred to as an object) that is difficult to be held by a conventional suction-type end effector, such as an article with a markedly uneven surface, a deformable article, or an article covered with a paper bag or gift wrapping paper. In addition, it is preferable that holding apparatuses applied to transfer apparatuses can handle articles in various shapes.

BRIEF DESCRIPTION OF THE DRAWINGS

FIGS. 3A, 4A, 5A, 6A, 7A, and 8A are top views illustrating a series of operations of the transfer apparatus according to the first embodiment, and FIGS. 3B, 4B, 5B, 6B, 7B, and 8B are side views corresponding to FIGS. 3A, 4A, 5A, 6A, 7A, and 8A.

FIG. 10A is a side view showing a structural example of a holding part according to the first embodiment.

FIGS. 10B, 10C, and 10D are side views illustrating an operation of the holding part shown in FIG. 10A.

FIG. 11D is a side view showing the holding part of FIG. 11C.

FIG. 11E is a top view showing a posture of the holding part when holding the top surface of an article.

FIG. 11F is a side view showing the holding part of FIG. 11E.

FIG. 12A is a top view showing a modification of an extraction arm according to the first embodiment.

FIG. 12B is a cross-sectional view showing the modification of the extraction arm according to the first embodiment.

DETAILED DESCRIPTION

Figure 1A:
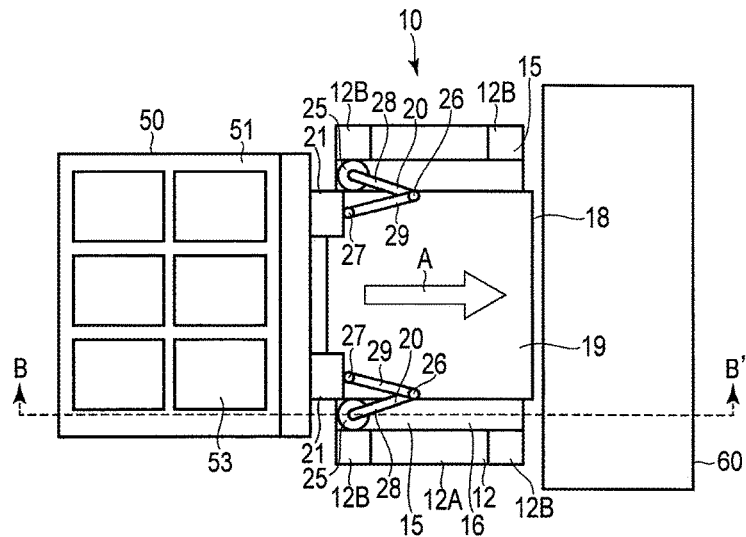
FIGS. 1A and 1B are a top view and a side view showing a transfer apparatus according to a first embodiment.

According to one embodiment, a transfer apparatus includes a base, a first linear motion member, a second linear motion member, a moving conveyor, an extraction arm, and a holding part. The first linear motion member is supported by the base and is movable in a first direction. The second linear motion member is supported by the first liner motion member and is movable in a second direction crossing the first direction. The moving conveyor is supported by the second linear motion member and includes a belt for conveying an article. The extraction arm is provided on a side of the moving conveyor, extracts the article, and places the article on the belt. The holding part is provided at an end of the extraction arm and holds the article.

Hereinafter, embodiments will be described with reference to the drawings. In the embodiments described below, to avoid any unnecessary repetition, like reference numerals will be used to denote like elements.

[First Embodiment]

Figure 1B:
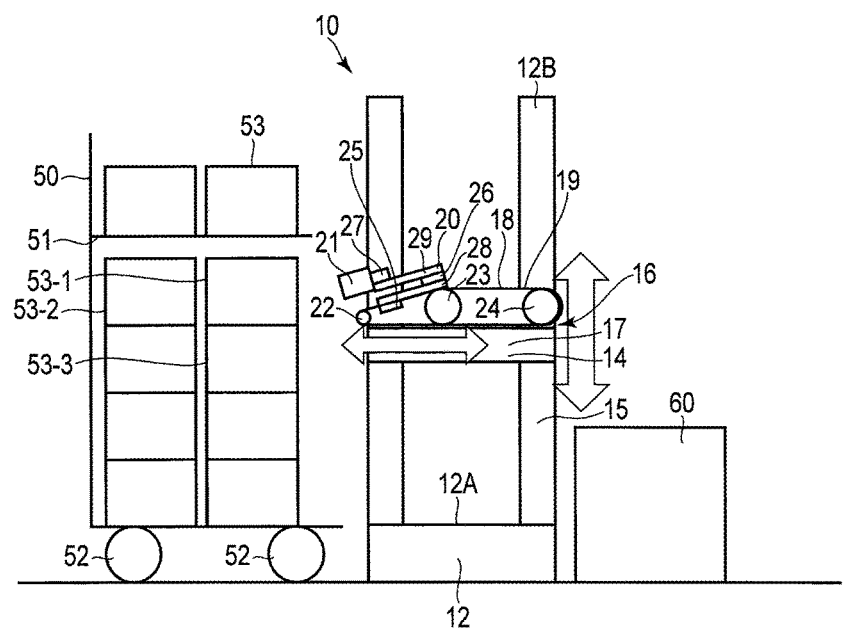

FIG. 1A is a top view schematically showing a transfer apparatus 10 according to a first embodiment, and FIG. 1B is a cross-sectional view of the transfer apparatus 10 taken along line B-B' shown in FIG. 1A. As shown in FIG. 1A, a box pallet 50 is placed in front of the transfer apparatus 10, and a conveyor 60 is placed behind the transfer apparatus 10. As shown in FIG. 1B, an intermediate shelf 51 is provided in the box pallet 50, and a stack of articles 53 are contained in the box pallet 50. In the present embodiment, the box pallet 50 has wheels 52 so that the box pallet 50 can move, and the transfer apparatus 10 and the conveyor 60 are fixed to the ground. The transfer apparatus 10 may be movable. For example, the transfer apparatus 10 may have wheels or may move along rails.

The transfer apparatus 10 transfers an article 53 contained in the box pallet 50 to the conveyor 60. The transfer apparatus 10 includes a base 12, a first linear motion member 14, a second linear motion member 16, a moving conveyor 18, and a pair of extraction arms 20. The base 12 includes, for example, a base member 12A in contact with the ground, and a plurality of vertical members 12B extending from the base member 12A in a vertical direction (up-down direction). In the example shown in FIG. 1B, four vertical members 12B are provided in the four corners of the base member 12A which is a rectangular parallelepiped.

The first linear motion member 14 is supported by the base 12 movable in the vertical direction. For example, one of the vertical members 12B is provided with a first linear motion mechanism 15, and the remaining three vertical members 12B are provided with guide rails extending in the vertical direction. The first linear motion member 14 can move in the vertical direction by being driven by the first linear motion mechanism 15.

The second linear motion member 16 is supported by the first linear motion member 14 movable in a front-back direction. In the present embodiment, the front-back direction is a direction orthogonal to the vertical direction, i.e., parallel to the horizontal plane. For example, the first linear motion member 14 is provided with a second linear motion mechanism 17 that drives the second linear motion member 16 in the front-back direction. The second linear motion member 16 can move in the front-back direction by being driven by the second linear motion mechanism 17.

The moving conveyor 18 is supported by the second linear motion member 16. Namely, the moving conveyor 18 is supported by the base 12 via the first linear motion member 14 and the second linear motion member 12, and can move in the vertical direction and the front-back direction. Accordingly, an end of the moving conveyor 18 can reach all areas of the box pallet 50. The moving conveyor 18 conveys an article 53 extracted or taken out from the box pallet 50 by the extraction arms 20, and loads the article 53 on the conveyor 60.

The moving conveyor 18 includes an annular belt 19 for conveying an article 53 in a transfer direction indicated by arrow A. The belt 19 is wound around pulleys 22, 23, and 24. The pulleys 22, 23, and 24 rotate about an axis extending in a direction orthogonal to the vertical direction and the front-back direction. Pulley 22 is placed in a front end portion of the moving conveyor 18, pulley 24 is placed in a rear end portion of the moving conveyor 18, and pulley 23 is placed between pulley 22 and pulley 24. The diameter of pulley 23 is the same as that of pulley 24, and the diameter of pulley 22 is smaller than that of pulley 23. Accordingly, when viewed from the side, the moving conveyor 18 is thinner at the end in the front portion, and has a fixed thickness in the rear portion. The belt 19 rotates by receiving torque generated by a motor which is not shown in the figure. The output shaft of the motor is coupled to pulley 23, for example.

The pair of extraction arms 20 are provided on the sides of the moving conveyor 18. Specifically, the pair of extraction arms 20 are supported by the first linear motion member 14 in such a manner as to be opposed to each other via the moving conveyor 18. Namely, the pair of extraction arms 20 are supported by the base 12 via the first linear motion member 14, and can move in the vertical direction. Placing the extraction arms 20 on the sides of the moving conveyor 18 enables insertion of the moving conveyor 18 in a space with a narrow width in the up-down direction. This is advantageous when extracting articles 53 stacked in the box pallet 50, in particular, when avoiding the intermediate shelf 51. For example, when extracting a front article 53-1 and then a back article 53-2, the moving conveyor 18 enters between the intermediate shelf 51 and article 53-3, and can reach the proximity of article 53-2.

The extraction arms 20 extract an article 53 from the box pallet 50, and place the article 53 on the belt 19. In the present embodiment, each extraction arm 20 is formed by three rotary joints 25, 26, and 27 and two links 28 and 29, and its end moves on a plane. The plane is a horizontal plane or a plane slightly slanted off the horizontal plane. In the present embodiment, the end of the extraction arm 20 is rotary joint 27, and moves on a plane slanted off the horizontal plane. In the example shown in FIG. 1B, the plane on which the end of the extraction arm 20 moves is parallel to the belt 19 in the front portion of the moving conveyor 18. The end of the extraction arm 20 is provided with a holding part 21 for holding an article 53. The holding part 21 holds an article 53 by, for example, vacuum suction.

Accordingly, the transfer apparatus 10 extracts an article 53 to the moving conveyor 18 by the extraction arms 20, and carries the article 53 placed on the moving conveyor 18. Namely, the article 53 is carried while being supported from below. Therefore, even an article 53 difficult to be held by the holding part 21 can be transferred to the conveyor 60 without being dropped. In addition, even an article 53 deformable or having a surface wrapped by paper can be transferred to the conveyor 60 without being damaged.

A conventional transfer apparatus that directly transfers an article from a pallet to a conveyor by an arm requires a large arm. Therefore, the place of installation of the conventional transfer apparatus is limited. In addition, the conventional transfer apparatus cannot access an article contained in a box of a box pallet. The transfer apparatus 10 of the present embodiment can be made more compact than the conventional transfer apparatus by using both the extraction arms 20 and the moving conveyor 18. As a result, the transfer apparatus 10 can extract an article placed in a narrow space, such as an article 53 contained in a box pallet 50 having an intermediate shelf 51.

The number of extraction arms 20 is not limited to the exemplary number, two, of the present embodiment. For example, one extraction arm 20 may be provided on a side of the moving conveyor 18. In addition, the extraction arm 20 is not limited to the one including three active joints (specifically, rotary joints 25, 26, and 27) as in the present embodiment, and may be one including one, two, four or more active joints.

Figure 2:
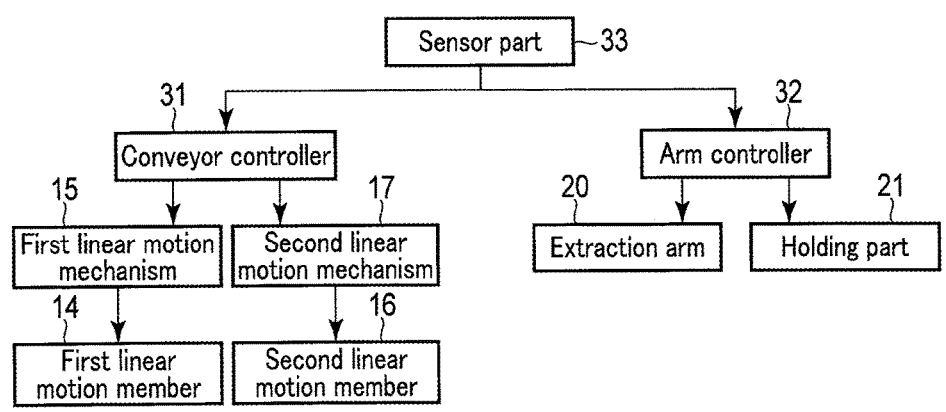
FIG. 2 is a block diagram showing a control system of the transfer apparatus according to the first embodiment.

FIG. 2 schematically shows a control system of the transfer apparatus 10. The transfer apparatus 10 includes a conveyor controller 31, an arm controller 32, and a sensor part 33. The conveyor controller 31 performs positioning control of the moving conveyor 18 relative to the article to be extracted (also referred to as "subject article"). Specifically, the conveyor controller 31 controls the first linear motion mechanism 15 to place the end of the moving conveyor 18 at the same level as the lower surface of the subject article, and controls the second linear motion mechanism 17 to move the moving conveyor 18 toward the subject article. The lower surface position of the subject article is detected by the sensor part 33.

The sensor part 33 detects the position and shape of the subject article, and generates a detection signal. The sensor part 33 includes, for example, an image sensor that generates an image signal by imaging a subject article, and an image processor that performs image processing on the image signal and detects the lower surface position of the subject article. The image sensor is provided in, for example, a base portion 12A of the base 12. It is possible that the sensor part 33 does not include the image processor, and the conveyor controller 31 performs the processing of detecting the lower surface position of the subject article. Based on the detection signal received from the sensor part 33, the conveyor controller 31 determines the position of the moving conveyor 18 of the time when the subject article is taken out by the extraction arm 20, and moves the moving conveyor 18 as described above. The conveyor controller 31 further performs rotation control of the belt 19 of the moving conveyor 18. Specifically, the conveyor controller 31 controls the motor coupled to the belt 19.

The arm controller 32 performs positioning control of the extraction arm 20 relative to the subject article. Specifically, the arm controller 32 determines a position of the subject article to be held based on the detection signal received from the sensor part 33. Then, the arm controller 32 drives the rotary joints 25, 26, and 27 to bring the end of the extraction arm 20, i.e., the holding part 21, into contact with the determined position. The arm controller 32 further drives the holding part 21 to hold the subject article.

Next, an operation example of the transfer apparatus 10 will be described with reference to FIGS. 3A to 8B.

FIGS. 3A, 4A, 5A, 6A, 7A, and 8A are top views schematically showing a series of operations for transferring a stack of articles contained in the box pallet 50 to the conveyor 60. FIGS. 3B, 4B, 5B, 6B, 7B, and 8B are cross-sectional views of the transfer apparatus 10 taken along line B-B' shown in FIGS. 3A, 4A, 5A, 6A, 7A, and 8A. In FIGS. 3A, 4A, 5A, 6A, 7A, and 8A, the intermediate shelf 51 and the articles 53 placed thereon are omitted.

Figure 3A:
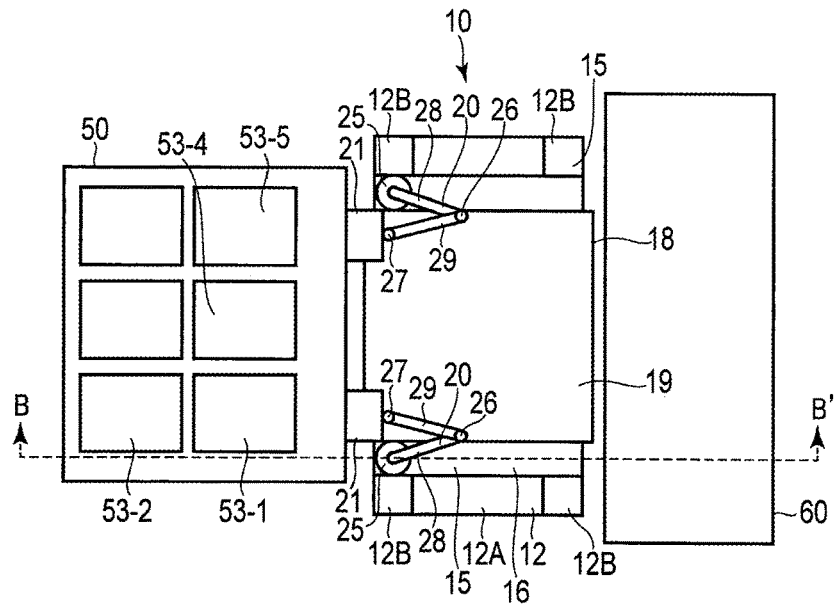
Figure 3B:
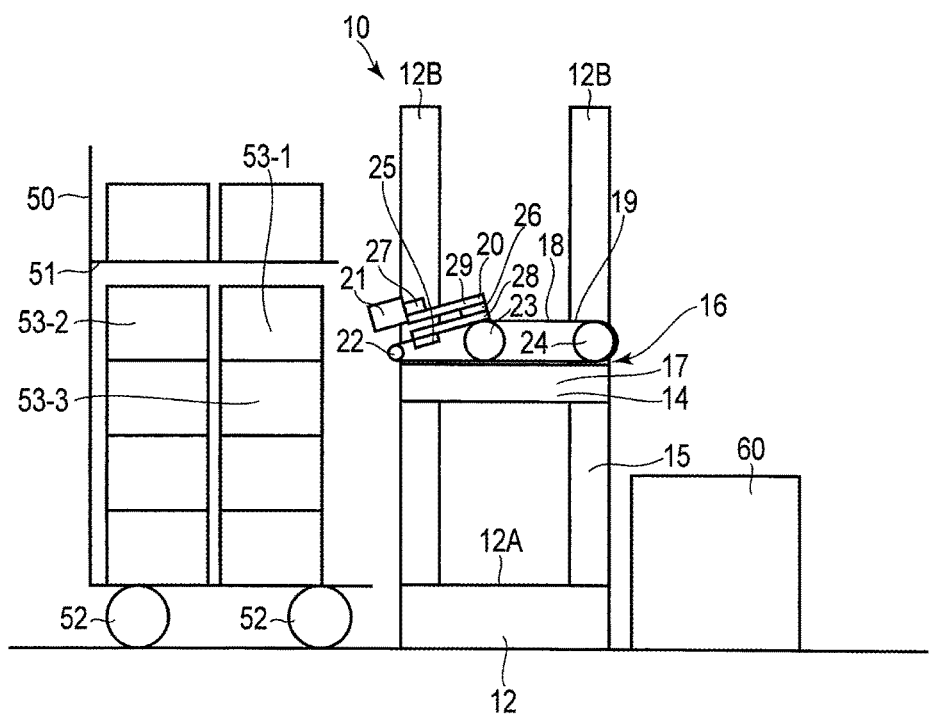

As shown in FIGS. 3A and 3B, the first linear motion member 14 is first driven by the first linear motion mechanism 15, and the moving conveyor 18 is lifted so that the level of its end becomes the same as the level of the lower surface of a subject article 53-1.

Figure 4A:
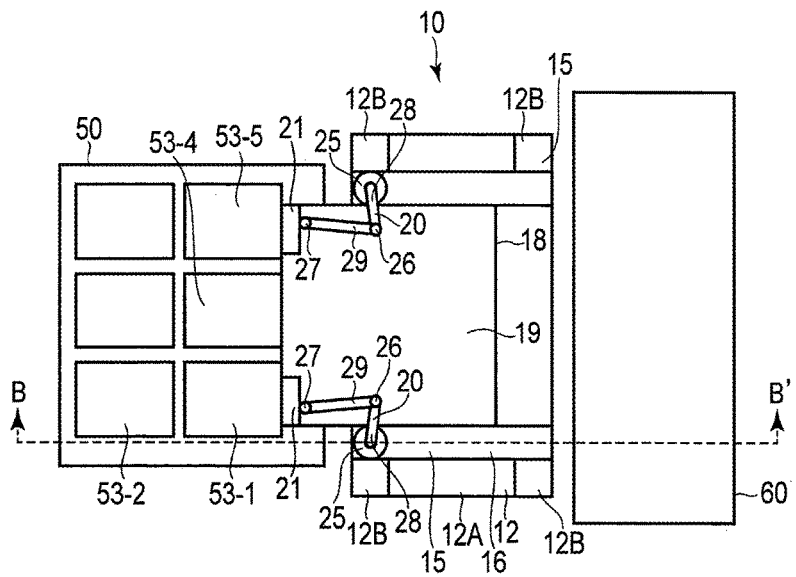
Figure 4B:
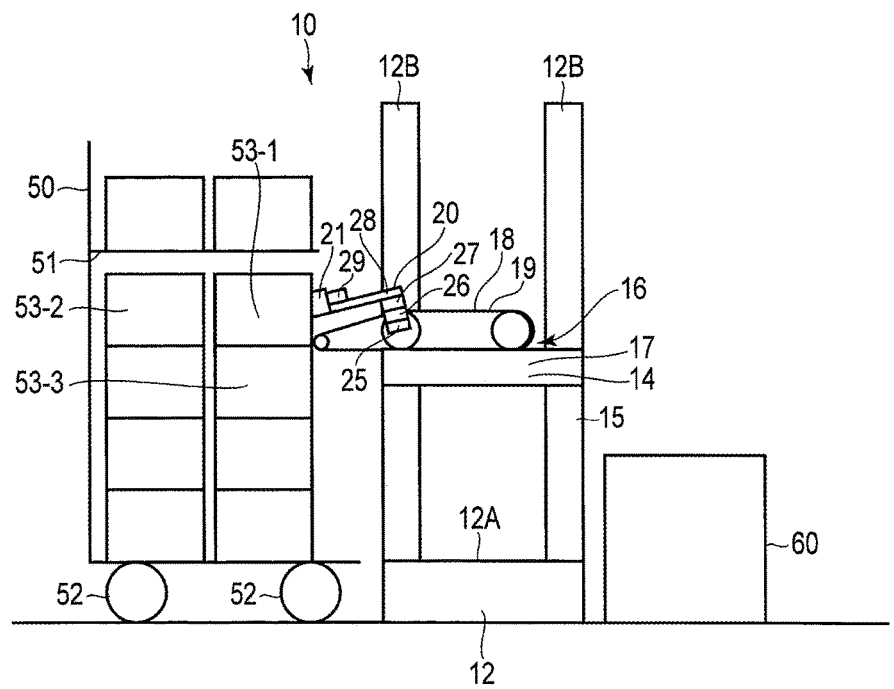

As shown in FIGS. 4A and 4B, the second linear motion member 16 is driven by the second linear motion mechanism 17, and the moving conveyor 18 moves toward the subject article 53-1. Then, the extraction arm 20 is driven to push the holding part 21 onto a side surface of the subject article 53-1 so that the subject article 53-1 is held by the holding part 21.

Figure 5A:
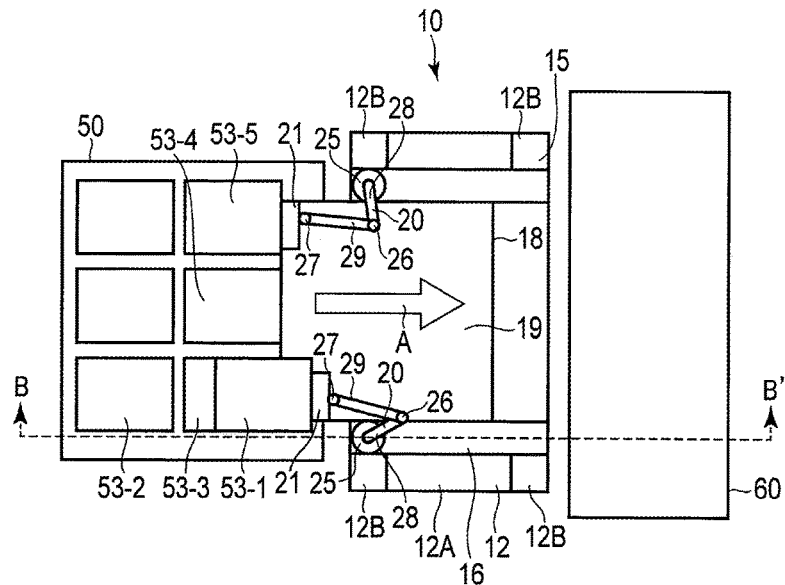
Figure 5B:
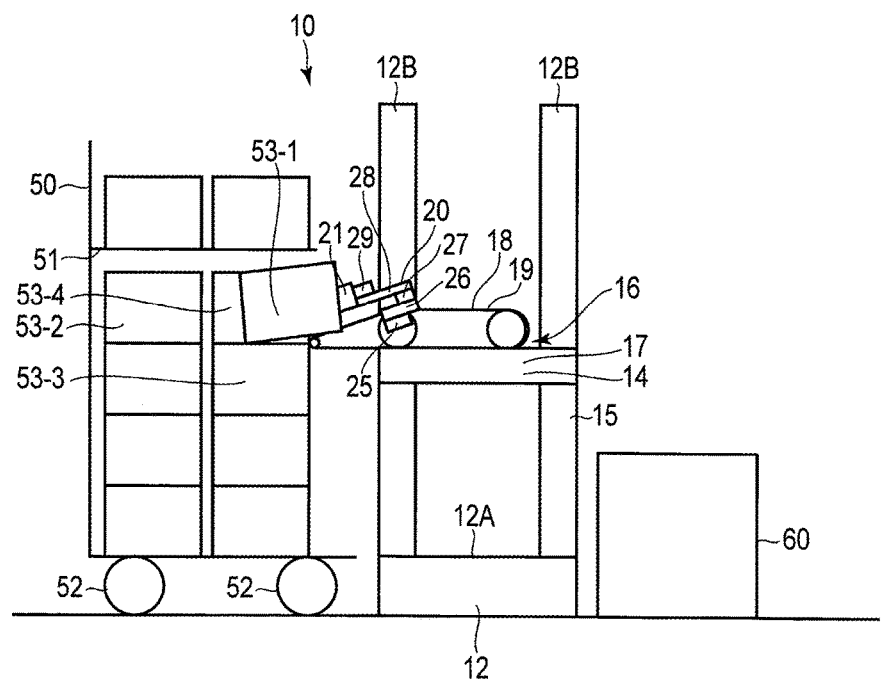

As shown in FIGS. 5A and 5B, the extraction arm 20 moves the subject article 53-1 onto the belt 19 of the moving conveyor 18. At this time, the belt 19 is driven in synchronization with the extraction arm 20. Namely, when the extraction arm 20 moves a subject article onto the belt 19, the belt 19 is rotated to transfer the subject article in the transfer direction indicated by arrow A in FIG. 5B. This facilitates placing the subject article 53-1 on the belt 19. In addition, since the end of the extraction arm 20 moves on a plane slanted in relation to the horizontal surface, the subject article 53-1 is extracted to slightly above the horizontal direction. Accordingly, the friction between the subject article 53-1 and article 53-3 therebelow is reduced, and the subject article 53-1 can be easily extracted.

Figure 6A:
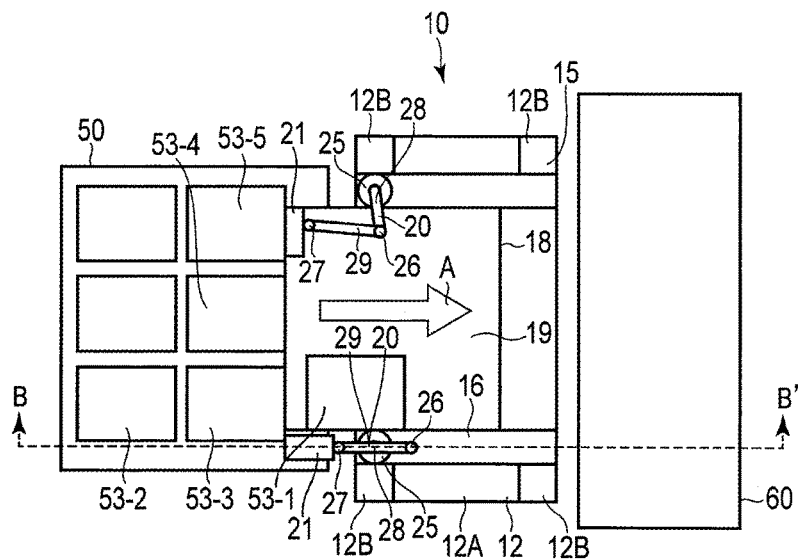
Figure 6B:
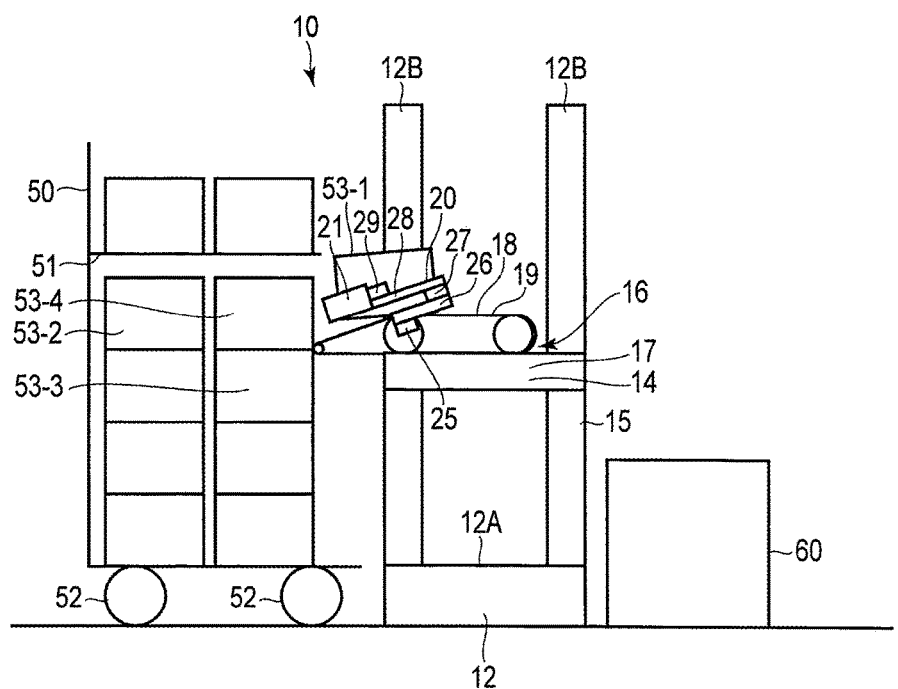

As shown in FIGS. 6A and 6B, after the subject article 53-1 is placed on the belt 19, the extraction arm 20 takes an article avoidance posture so as to not prevent the subject article 53-1 from passing on the belt 19. Namely, the arm controller 32 clears the extraction arm 20 from the moving conveyor 18. The moving conveyor 18 conveys the subject article 53-1 and stops after the subject article 53-1 is placed entirely on the belt 19.

By repeating the operations shown in FIGS. 3A, 4A, 5A, and 6A, a plurality of articles 53 can be placed on the moving conveyor 18 as shown in FIGS. 7A and 7B. For example, the transfer apparatus 10 is operated to place as many articles 53 as possible on the moving conveyor 18. In the example, shown in FIGS. 7A and 7B, three articles 53-1, 53-2, and 53-3 are placed on the moving conveyor 18.

Figure 8A:
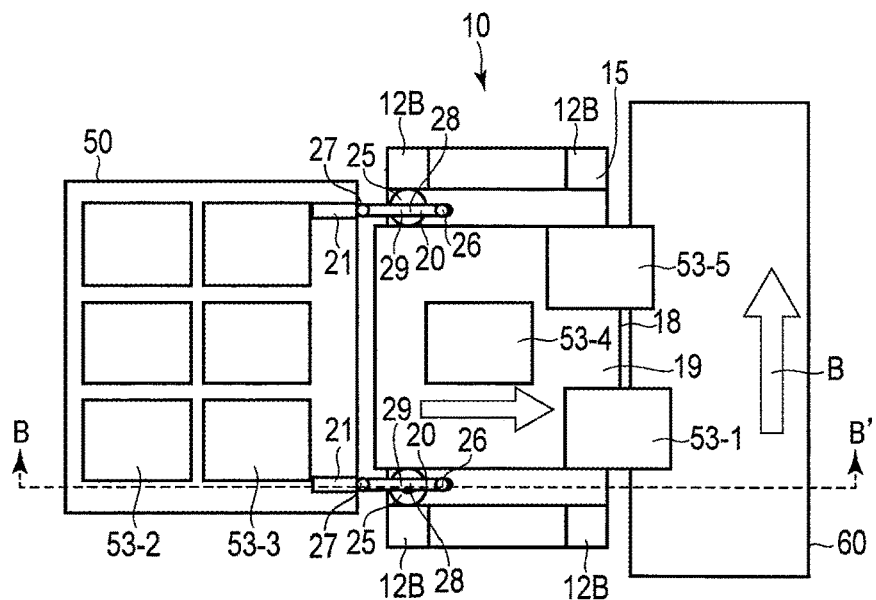
Figure 8B:
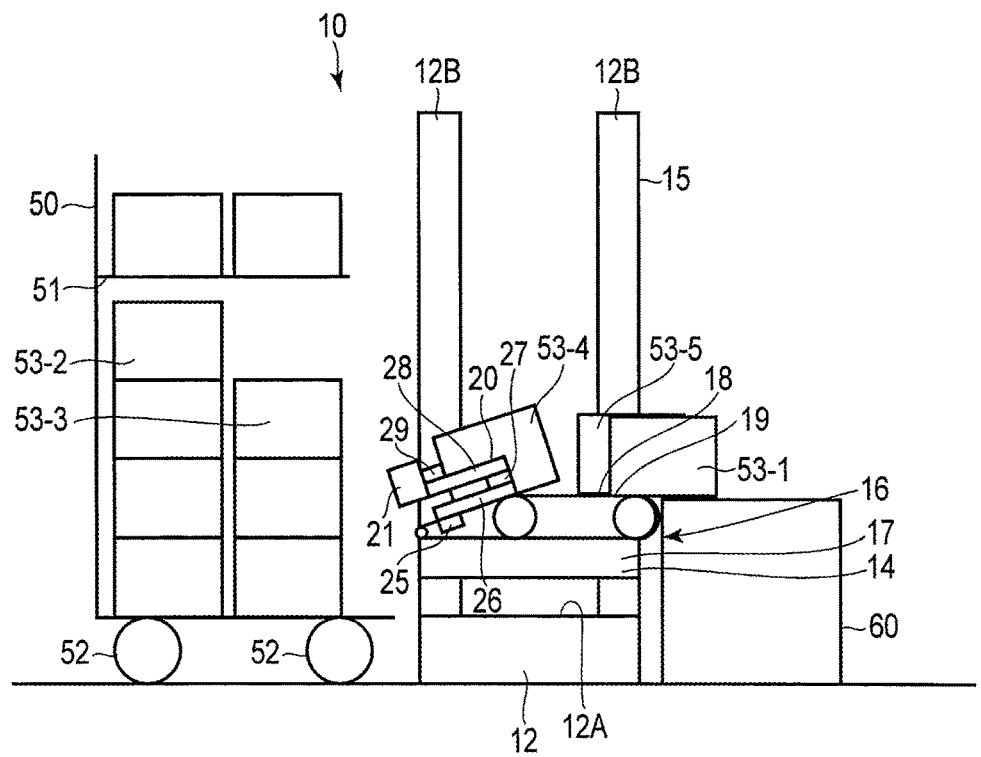

Next, as shown in FIGS. 8A and 8B, the first linear motion member 14 is driven by the first linear motion mechanism 15, and the moving conveyor 18 moves down to the level of the conveyor 60. After that, the moving conveyor 18 is driven, i.e., the belt 19 is rotated, and articles 53 are thereby loaded on the conveyor 60. The conveyor 60 is a belt conveyor apparatus that conveys an article 53 in the conveying direction indicated by arrow B in FIG. 8A, for example. The article transfer destination (unloading area) of the transfer apparatus 10 is not limited to the active table like the conveyor 60, and may be a static table, such as a pallet or a work table.

Figure 9A:
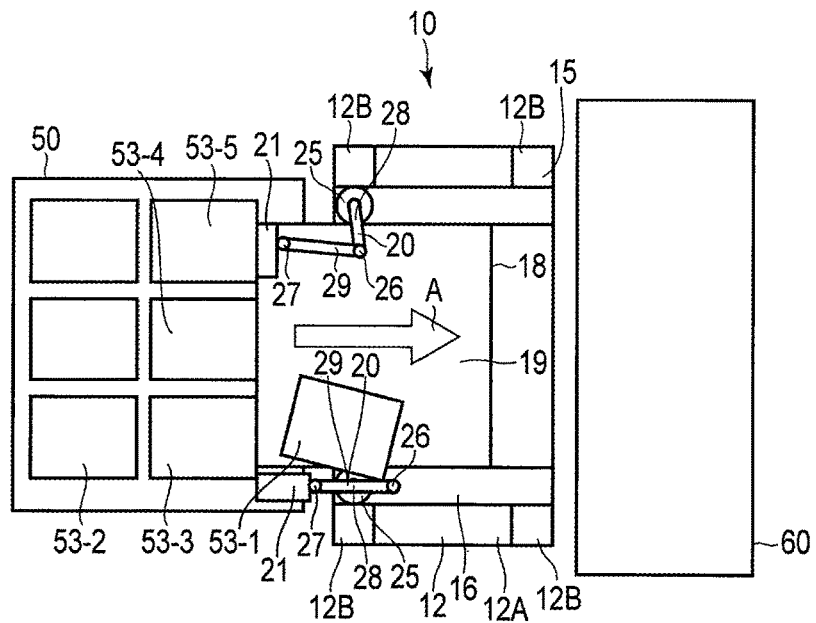
FIGS. 9A and 9B are top views showing an example of an article transfer method according to the first embodiment.
Figure 9B:
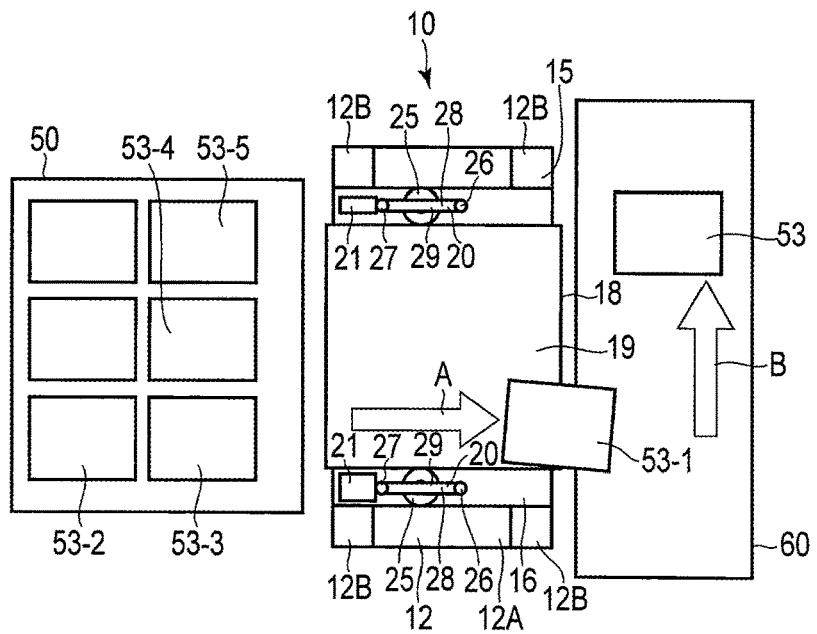

When an article 53 is loaded from the moving conveyor 18 on the conveyor 60, a state where the article 53 straddles two moving belts temporarily occurs. Therefore, when the transfer direction A of the moving conveyor 18 differs from the transfer direction B of the conveyor 60, the posture of the article changes when the article is loaded on the conveyor 60. In the present embodiment, the transfer direction A of the moving conveyor 18 is approximately orthogonal to the transfer direction B of the conveyor 60. For example, when articles 53 are conveyed by the moving conveyor 18 in a state where the articles 53 are aligned in the transfer direction A of the moving conveyor 18, each article 53 takes a slanted posture relative to the transfer direction B of the conveyor 60 after being loaded on the conveyor 60. The articles 53 are preferably aligned in the transfer direction of the conveyor 60 on the conveyor 60. In one embodiment, as shown in FIG. 9A, the extraction arm 20 places the article 53 on the moving conveyor 18 with the posture of the article 53 slanted relative to transfer direction A, in consideration of the posture change when the article 53 is loaded on the conveyor 60. Accordingly, as shown in FIG. 9B, articles 53 can be aligned on the conveyor 60 in its transfer direction B.

Accordingly, the transfer apparatus 10 extracts an article 53 to the moving conveyor 18 by the extraction arms 20, and carries the article 53 placed on the moving conveyor 18. Accordingly, an article 53 can be transferred to the unloading area without being dropped or damaged.

Next, the structure of the holding part 21 will be described in detail.

FIG. 10A schematically shows a structural example of the holding part 21. The holding part 21 shown in FIG. 10A includes an elastic passive joint 91 provided at the end of the extraction arm 20, and a first end member 92 and second end member 93 connected to the elastic passive joint 91. For example, when the holding part 21 is of a suction type, the first end member 92 and second end member 93 are each provided with a suction pad 94 on their surfaces brought into contact with the article.

When no external force is applied to the first end member 92 and the second end member 93, the first end member 92 and the second send member 93 are held to be approximately orthogonal to each other by an action of an elastic body forming the elastic passive joint 91.

As shown in FIG. 10B, when an article 95 having a large front surface (side surface facing the transfer apparatus 10) is held, the first end member 92 and the second end member 93 are pushed onto the front surface of the article 95. Accordingly, the first end member 92 and the second end member 93 passively open to be approximately parallel to each other, and come into contact with the front surface of the article 95. The holding part 21 can thereby hold the article 95.

In contrast, as shown in FIG. 10C, when an article 96 having a small front surface and a large top surface is held, the first end member 92 and the second end member 93 are pushed onto the top surface of the article 96. Accordingly, the first end member 92 and the second end member 93 passively open to be approximately parallel to each other, and come into contact with the top surface of the article 96. The holding part 21 can thereby hold the article 96.

The holding member 21 can also hold a corner of the article 97 in a state where the first end member 92 and the second end member 93 are approximately orthogonal to each other, as shown in FIG. 10D.

Forming the holding part 21 by a passive mechanism enables handling of articles in various shapes. The holding part 21 shown in FIG. 10A may be applied to not only the transfer apparatus 10, but also any other apparatus.

Figure 11A:
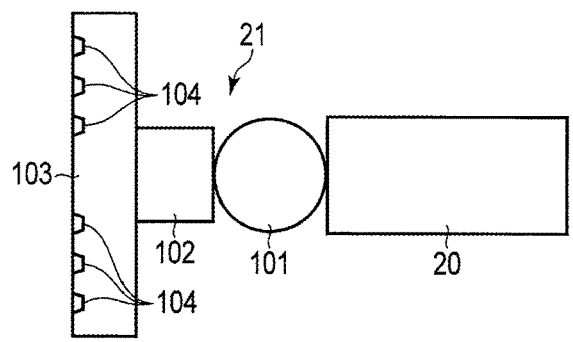
FIG. 11A is a top view showing another structural example of the holding part according to the first embodiment, and showing a posture of the holding part when holding the front surface of an article.

FIG. 11A schematically shows another structural example of the holding part 21. The holding part 21 shown in FIG. 11A includes a rotary joint 101 provided at the end of the extraction arm 20, a rotary joint 102 provided at an end of rotary joint 101, and an end member 103 provided at an end of rotary joint 102. The rotary joints 101 and 102 are driven by a drive source (not shown) such as a motor. The rotational axis of rotary joint 101 is approximately orthogonal to that of rotary joint 102. The end surface (also referred to as "holding surface") of the end member 103 is rectangular. A suction pad 104 is provided on the end surface.

Figure 11B:
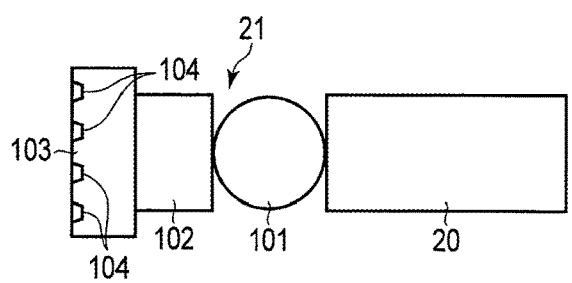
FIG. 11B is a side view showing the holding part of FIG. 11A.
Figure 11C:
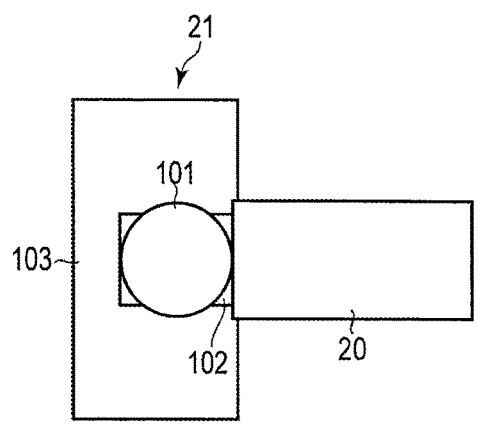
FIG. 11C is a top view showing a posture of the holding part when holding the top surface of an article.

FIGS. 11A and 11B are a top view and side view showing a posture of the holding part 21 at the time of holding the front surface of an article. FIGS. 11C and 11D are a top view and side view showing a posture of the holding part 21 at the time of holding the top surface of an article. The holding part 21 changes its posture from the one shown in FIGS. 11A and 11B to the one shown in FIGS. 11C and 11D by rotating rotary joint 101 90 degrees. When the width of the article is small, the holding part 21 changes its posture from the one shown in FIGS. 11C and 11D to the one shown in FIGS. 11E and 11F by rotating rotary joint 102 90 degrees. This enables the short side of the holding surface to correspond to the width direction of the article. As a result, an article having a small width can be held.

FIG. 12A is a top view schematically showing the transfer apparatus 10 including a modification of the extraction arm 20 according to the present embodiment, and FIG. 12B is a cross-sectional view of the transfer apparatus 10 taken along line B-B' shown in FIG. 12A. The extraction arm 20 shown in FIGS. 12A and 12B further includes a ball caster 111 in contact with the belt 19 of the moving conveyor 18. The ball caster 111 is provided on an end portion of the extraction arm 20, specifically, on a link 29. In this configuration, the weight of the article and that of the extraction arm 20 are supported by the moving conveyor 18 via the ball caster 111. Accordingly, the weight supported by the extraction arm 20 can be reduced. As a result, the extraction arm 20 can be made compact. For example, links 28 and 29 can be thinned.

As described above, the transfer apparatus according to the present embodiment includes a moving conveyor movable in a vertical direction and a front-back direction, and an extraction arm provided on a side of the moving conveyor and movable in the vertical direction, and moves an article by using both the moving conveyor and the extraction arm. This enables handling of articles in various conditions.

[Second Embodiment]

The second embodiment will be described with reference to FIG. 13. The second embodiment differs from the first embodiment in terms of the configuration of the extraction arm. In the second embodiment, the elements different from that in the first embodiment (i.e., the extraction arm) will be described, and descriptions of the elements that are the same as those in the first embodiment will be omitted.

Figure 13:
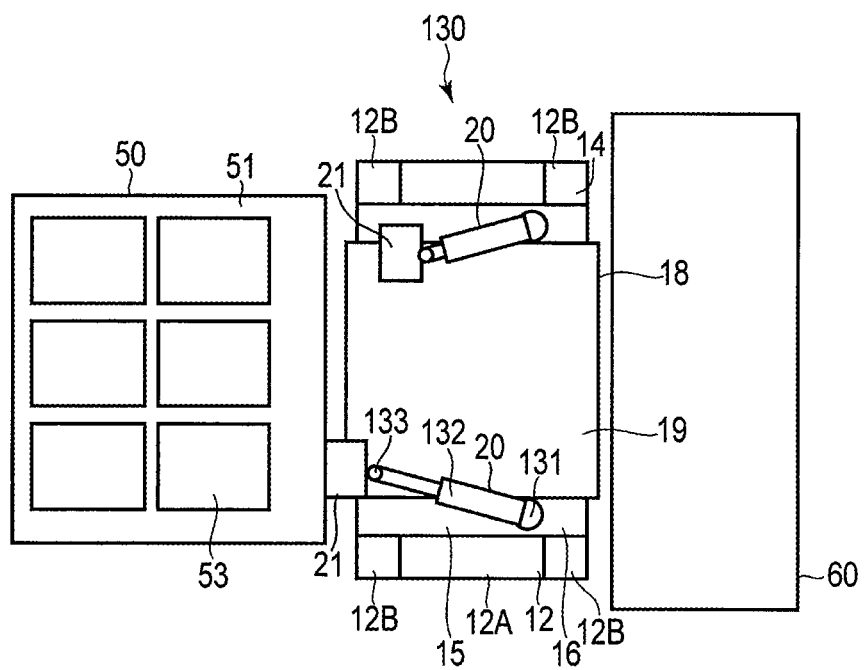
FIG. 13 is a top view showing a transfer apparatus according to a second embodiment.

FIG. 13 schematically shows a transfer apparatus 130 according to the second embodiment. As shown in FIG. 13, the extraction arm 20 of the present embodiment includes a rotary joint 131 provided on the first linear motion member 14, a linear motion joint 132 connected to the end of the rotary joint 131, and a rotary joint 133 connected to the end of the liner motion joint 132. The linear motion joint 132 is an active joint driven by a drive source which is not shown in the figure, and performs a linear motion. In accordance with the linear motion of the linear motion joint 132, the distance between rotary joint 131 and rotary joint 133 changes. In addition, the posture of the holding part 21 can be changed by driving of rotary joint 131.

In the present embodiment, the mechanism becomes complicated due to formation of the extraction arm 20 by using the linear motion joint 132; however, the extraction arm 20 can easily take an article avoidance posture, and can inhibit the occurrence of a singular point. As a result, easier control can be achieved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A transfer apparatus, comprising:
a base;
a first linear motion member supported by the base and movable in a first direction;
a second linear motion member supported by the first linear motion member and movable in a second direction crossing the first direction;
a moving conveyor supported by the second linear motion member and including a belt for conveying an article;
an extraction arm that extracts the article and places the article on the belt; and
a holding part, provided at an end of the extraction arm, that holds the article, the holding part including an elastic passive joint provided at the end of the extraction arm, and a first end member and a second end member connected to the elastic passive joint, the first end member and the second end member being held by the elastic passive joint to be approximately orthogonal to each other in a state where the first end member and the second end member are out of contact from the article, and to be approximately orthogonal or approximately parallel to each other in a state where the first end member and the second end member are in contact with the article.

2. The transfer apparatus according to claim 1, wherein the end of the extraction arm moves on a plane slanted in relation to a plane orthogonal to the first direction.

3. The transfer apparatus according to claim 1, wherein the belt is rotated when the extraction arm places the article on the belt.

4. The transfer apparatus according to claim 1, wherein the extraction arm includes one or more active joints.

5. The transfer apparatus according to claim 1, further comprising:
a conveyor controller that performs positioning control of the moving conveyor relative to the article and rotation control of the belt; and
an arm controller that performs positioning control of the extraction arm relative to the article.

6. The transfer apparatus according to claim 5, further comprising:
a detector that detects a position of a lower surface of the article to generate a detection signal,
wherein the conveyor controller determines, based on the detection signal, a position of the moving conveyor at a time when the article is extracted by the extraction arm.

7. The transfer apparatus according to claim 5, further comprising:
a detector that detects a position and shape of the article to generate a detection signal,
wherein the arm controller determines, based on the detection signal, a position of the article to be held.

8. The transfer apparatus according to claim 1, wherein the extraction arm includes a caster in contact with the belt for supporting weight of the article.

9. The transfer apparatus according to claim 1, wherein the moving conveyor loads on another conveyor the article placed on the belt.

10. The transfer apparatus according to claim 9, wherein the moving conveyor places a plurality of articles on the belt and then loads the articles on the other conveyor.

11. The transfer apparatus according to claim 1, wherein the extraction arm places the article on the belt with the article slanted with respect to a transfer direction in which the belt conveys the article.

12. The transfer apparatus according to claim 1, further comprising:
   another extraction arm provided to face the extraction arm via the moving conveyor.

13. The transfer apparatus according to claim 1, wherein the first end member and the second end member hold the article by a suction pad.

14. The transfer apparatus according to claim 1, wherein the extraction arm is provided on a side of the moving conveyor.

* * * * *